United States Patent
Neu et al.

(10) Patent No.: US 10,723,201 B2
(45) Date of Patent: Jul. 28, 2020

(54) METHODS AND SYSTEMS TO CONTROL ENGINE LOADING ON A TRANSPORT REFRIGERATION SYSTEM

(71) Applicant: THERMO KING CORPORATION, Minneapolis, MN (US)

(72) Inventors: Timothy J. Neu, Cottage Grove, MN (US); Brett Heberer, Minneapolis, MN (US); James E. Conde, Plymouth, MN (US); Wayne Donnellan, Oranmore (IE)

(73) Assignee: Thermo King Corporation, Minneapolis, MN (US)

( * ) Notice: Subject to any disclaimer, the term of this patent is extended or adjusted under 35 U.S.C. 154(b) by 283 days.

(21) Appl. No.: 15/251,665

(22) Filed: Aug. 30, 2016

(65) Prior Publication Data

US 2017/0057323 A1    Mar. 2, 2017

Related U.S. Application Data

(60) Provisional application No. 62/212,222, filed on Aug. 31, 2015.

(51) Int. Cl.
*B60H 1/32* (2006.01)
*B60H 1/00* (2006.01)
(Continued)

(52) U.S. Cl.
CPC ....... *B60H 1/3205* (2013.01); *B60H 1/00364* (2013.01); *B60H 1/3226* (2013.01);
(Continued)

(58) Field of Classification Search
CPC .............. B60H 1/3205; B60H 1/00364; B60H 1/3226; B60H 1/00885; B60H 1/00899;
(Continued)

(56) References Cited

U.S. PATENT DOCUMENTS 3,786,828 A * 1/1974 Krechel ................ F04B 49/022
                                                             137/115.19
4,620,424 A * 11/1986 Tanaka .................. F25B 41/062
                                                                  62/222

(Continued)

FOREIGN PATENT DOCUMENTS

EP          0620407         10/1994
EP          1038702          9/2000
(Continued)

OTHER PUBLICATIONS

European Search Report issued in corresponding European Application No. 16186578.7 dated Feb. 22, 2017 (9 pages).

*Primary Examiner* — Marc E Norman
*Assistant Examiner* — Schyler S Sanks
(74) *Attorney, Agent, or Firm* — Hamre, Schumann, Mueller & Larson, P.C.

(57) ABSTRACT

Methods and systems for controlling a transport refrigeration system are provided. In one instance, the method includes identifying an operational mode change request for a heat exchanger unit of the transport refrigeration system. The method also includes preparing the transport refrigeration system for the operational mode change of the heat exchanger unit, wherein preparing the transport refrigeration system for the operational mode change of the heat exchanger unit includes performing a load control action, the load control action preventing a power source of the transport refrigeration system from at least one of operating outside of a predefined revolutions per minute (RPM) bandwidth and exceeding a predefined power limit of the power source. Also, the method includes changing the operational mode of the heat exchanger unit; and removing the load control action.

20 Claims, 5 Drawing Sheets

(51) Int. Cl.
*B60P 3/20* (2006.01)
*F25D 29/00* (2006.01)
*F25B 49/02* (2006.01)
*F25B 27/00* (2006.01)
*B62D 63/08* (2006.01)

(52) U.S. Cl.
CPC ............... *B60P 3/20* (2013.01); *F25B 27/00* (2013.01); *F25B 49/02* (2013.01); *F25D 29/003* (2013.01); *B60H 2001/325* (2013.01); *B60H 2001/327* (2013.01); *B60H 2001/3236* (2013.01); *B60H 2001/3238* (2013.01); *B60H 2001/3241* (2013.01); *B60H 2001/3255* (2013.01); *B60H 2001/3261* (2013.01); *B60H 2001/3282* (2013.01); *B60H 2001/3285* (2013.01); *B62D 63/08* (2013.01); *F25B 2327/00* (2013.01); *F25B 2500/19* (2013.01); *F25B 2600/2513* (2013.01); *F25B 2700/15* (2013.01); *F25B 2700/173* (2013.01); *F25B 2700/1931* (2013.01); *F25B 2700/1933* (2013.01); *F25B 2700/2106* (2013.01); *F25B 2700/21171* (2013.01)

(58) Field of Classification Search
CPC .......... B60H 1/3216; B60H 2001/3285; B60H 2001/3283; B60H 2001/3261; F25B 49/02; F25B 2327/001; F25B 2500/19; F25B 2600/2513; F25B 2700/05; F25B 2600/024; F25B 2500/26
See application file for complete search history.

(56) References Cited

U.S. PATENT DOCUMENTS

| | | | |
|---|---|---|---|
| 5,193,353 | A | 3/1993 | Brendel et al. |
| 6,085,533 | A * | 7/2000 | Kaido ................... F25B 49/022 62/196.2 |
| 2013/0289847 | A1 | 10/2013 | Olaleye et al. |

FOREIGN PATENT DOCUMENTS

| | | | |
|---|---|---|---|
| EP | 1038702 A2 * | 9/2000 | ........... B60H 1/3204 |
| EP | 1039252 | 9/2000 | |
| EP | 1790921 | 5/2007 | |
| EP | 2621744 | 8/2013 | |
| WO | 2012047499 | 4/2012 | |
| WO | 2013134453 | 9/2013 | |

* cited by examiner

US 10,723,201 B2

METHODS AND SYSTEMS TO CONTROL ENGINE LOADING ON A TRANSPORT REFRIGERATION SYSTEM

FIELD

The embodiments described herein are directed to a transport refrigeration system (TRS). More particularly, the embodiments described herein relate to methods and systems to regulate power source loading of the TRS during an operational mode change of the TRS.

BACKGROUND

A transport refrigeration system (TRS) is generally used to control an environmental condition (e.g., temperature, humidity, air quality, and the like) within a transport unit (e.g., a container on a flat car, an intermodal container, etc.), a truck, a box car, or other similar transport unit. In some embodiments, the transport unit can include a plurality of zones and the TRS can be a multi-zone TRS (MTRS) that is configured to provide independent climate control to each of the plurality of zones within the transport unit.

SUMMARY

The embodiments described herein are directed to a transport refrigeration system (TRS). More particularly, the embodiments described herein relate to methods and systems to regulate power source loading of the TRS during an operational mode change of the TRS.

In particular, the embodiments described herein can manage system loads of the TRS during an operational mode change of a heat exchanger unit of the TRS so that a power source of the TRS, for example, can remain within a predefined revolutions per minute (RPM) band and/or not exceed a predefined power limit.

In some embodiments, the power source can be a prime mover such as an engine, an electric motor, etc. In some embodiments, when the power source is an engine, the engine can be a sub-25 horse power engine.

The TRS is generally used to control an environmental condition (e.g., temperature, humidity, air quality, and the like) within a transport unit (e.g., a container on a flat car, an intermodal container, etc.), a truck, a box car, or other similar transport unit. The transport unit can include a plurality of zones and the TRS can be a multi-zone TRS (MTRS). Each zone may require a climate condition (e.g., temperature, humidity, air quality, etc.) that is different from other zone(s). The MTRS can be configured to provide independent climate control to each of the plurality of zones within the transport unit.

The MTRS may have one host unit and one or more remote units (collectively referred to herein as heat exchanger units) that are each configured to provide climate control to each of the one or more zones within the multi-zone transport unit. Each heat exchanger unit may have a heat exchanger (e.g., an evaporator) and one or more fans. Each heat exchanger unit can be connected to a refrigeration circuit of the MTRS via a refrigerant line. Each heat exchanger unit may be used to provide climate control for a separate zone of the transport unit. The MTRS can be used to, for example, cool, heat, and defrost the one or more zones of the transport unit. Note that in some instances, each heat exchanger unit may include two or more heat exchangers (e.g., a first evaporator and a second evaporator connected in parallel or in series).

In one embodiment, a method for controlling a TRS is provided. The method includes identifying an operational mode change request for a heat exchanger unit of the transport refrigeration system. The method also includes preparing the transport refrigeration system for the operational mode change of the heat exchanger unit, wherein preparing the transport refrigeration system for the operational mode change of the heat exchanger unit includes performing a load control action, the load control action preventing a power source of the transport refrigeration system from at least one of operating outside of a predefined revolutions per minute (RPM) bandwidth and exceeding a predefined power limit of the power source. Also, the method includes changing the operational mode of the heat exchanger unit; and removing the load control action.

In another embodiment, a TRS is provided. The TRS includes a heat exchanger unit and a controller. The controller is configured to identify an operational mode change request of the heat exchanger unit. The controller is also configured to prepare the transport refrigeration system for the operational mode change of the heat exchanger unit, including performing a load control action, wherein preparing the transport refrigeration system for the operational mode change of the heat exchanger unit includes the controller performing a load control action, the load control action preventing a power source of the transport refrigeration system from at least one of operating outside of a predefined revolutions per minute (RPM) bandwidth and exceeding a predefined power limit of the power source. Also, the controller is configured to change the operational mode of the heat exchanger unit, and to remove the load control action after changing the operational mode of the heat exchanger unit.

DETAILED DESCRIPTION

Figure 1A:
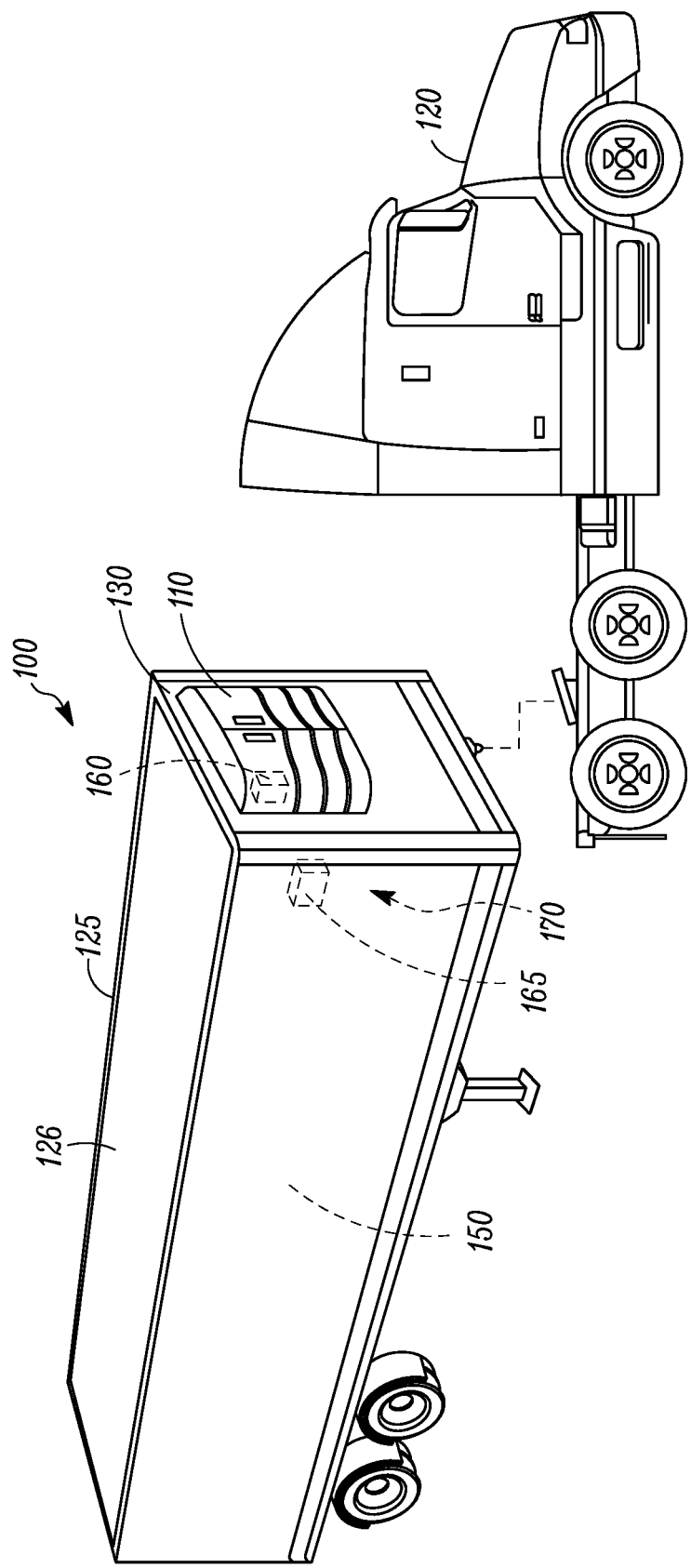
FIG. 1A illustrates an embodiment of a refrigerated transport unit that is attached to a tractor.

The embodiments described herein are directed to a transport refrigeration system (TRS). More particularly, the embodiments described herein relate to methods and systems to regulate power source loading of a TRS during an operational mode change of the TRS.

In particular, the embodiments described herein can manage system loads of the TRS during an operational mode change of a heat exchanger unit of the TRS so that a power source of the TRS, for example, can remain within a predefined revolutions per minute (RPM) band and/or not exceed a predefined power limit.

References are made to the accompanying drawings that form a part hereof, and in which is shown by way of illustration of the embodiments in which the methods and systems described herein may be practiced.

The TRS is generally used to control an environmental condition (e.g., temperature, humidity, air quality, and the like) within a transport unit (e.g., a container on a flat car, an intermodal container, etc.), a truck, a box car, or other similar transport unit. The transport unit can include a plurality of zones and the TRS can be a multi-zone TRS (MTRS). Each zone may require a climate condition (e.g., temperature, humidity, air quality, etc.) that is different from other zone(s). The MTRS can be configured to provide independent climate control to each of the plurality of zones within the transport unit.

The MTRS may have one host unit and one or more remote units that are each configured to provide climate control to each of the one or more zones within the multi-zone transport unit. A TRU of the MTRS may include a compressor, an expansion valve, a first heat exchanger (e.g., condenser), and a host unit. The host unit can include a second heat exchanger (e.g., a host evaporator), one or more fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the MTRS. Each remote unit may have a remote heat exchanger (e.g., a remote evaporator), one or more fan(s) for providing climate control within the particular zone the host unit is located, one or more flow regulating devices (e.g., solenoid valve(s), etc.) for controlling the amount of refrigerant flow into the host unit, and one or more throttling devices (e.g., electronic throttling valve(s), etc.) for controlling the amount of refrigerant flow available to a suction end of the compressor of the MTRS. Each remote unit can be connected to the TRU via a common refrigerant line. One remote unit may be used to provide climate control for one zone of the transport unit. A MTRS can be used to, for example, cool, heat, and defrost the one or more zones of the transport unit. Note that in some instances, the remote unit may have two or more remote heat exchangers (e.g., a first remote evaporator and a second remote evaporator connected in parallel or in series).

The TRS includes a refrigeration circuit and a controller (e.g., a TRS controller) that is configured to manage, command, direct, and regulate the behavior of one or more components of the refrigeration circuit (e.g., an evaporator, a condenser, a compressor, an expansion device, etc.). The TRS generally may be a vapor-compressor type refrigeration system, or any other suitable refrigeration system that can use refrigerant, cold plate technology, etc.

The term "ambient temperature" as used herein refers to an air temperature outside of the transport unit.

The term "load control action" as used herein refers to an action taken by the TRS to prevent a power source from operating outside of a predefined RPM band and/or exceeding a predefined power limit during an operational mode change. In one embodiment, the load control action can include controlling an opening percentage of a flow regulating device in a refrigeration circuit of the TRS. In another embodiment, the load control action can include controlling an opening percentage of an expansion device in a refrigeration circuit. In another embodiment, the load control action can include adjusting a fan speed of one or more heat exchanger fans and/or blowers. In another embodiment, the load control action can include removing and/or reducing a battery charging load of a battery charger of the TRS. In another embodiment, the load control action can include adjusting an engine speed of a power source of the TRS when the power source is a two-speed or variable speed engine. In another embodiment, the load control action can include unloading a compressor of the TRS.

The term "future load of the power source" as used herein refers to a predicted load on the power source upon the operational mode change of a zone of the multi-zone transport unit.

FIG. 1A illustrates one embodiment of a TRS 100 for a transport unit (TU) 125 that is attached to a tractor 120. The TRS 100 includes a transport refrigeration unit (TRU) 110 that provides environmental control (e.g. temperature, humidity, air quality, etc.) within an internal space 150 of the TU 125. The TRS 100 also includes a TRS controller 170 and one or more sensors (not shown) that are configured to measure one or more parameters of the TRS 100 and communicate parameter data to the TRS controller 170. The TRS 100 is powered by a power source 112 (shown in FIG. 1B).

The TRU 110 is disposed on a front wall 130 of the TU 125. In other embodiments, it will be appreciated that the TRU 110 can be disposed, for example, on a rooftop 126 or another wall of the TU 125. The tractor 120 is attached to and is configured to tow the transport unit 125. It will be appreciated that the embodiments described herein are not limited to trucks and trailer units, but can apply to any other type of transport unit (e.g., a container on a flat car, an intermodal container, etc.), a truck, a box car, or other similar transport unit.

The programmable TRS Controller 170 that may comprise a single integrated control unit 160 or that may comprise a distributed network of TRS control elements 160, 165. The number of distributed control elements in a given network can depend upon the particular application of the principles described herein. The TRS controller 170 is configured to control operation of the TRS 100. The TRS controller 170 may also regulate the operation of the TRS 100 to prevent overloading a power source, e.g. a diesel engine, during an operational mode change of the TRS as described in more detail below.

Figure 1B:
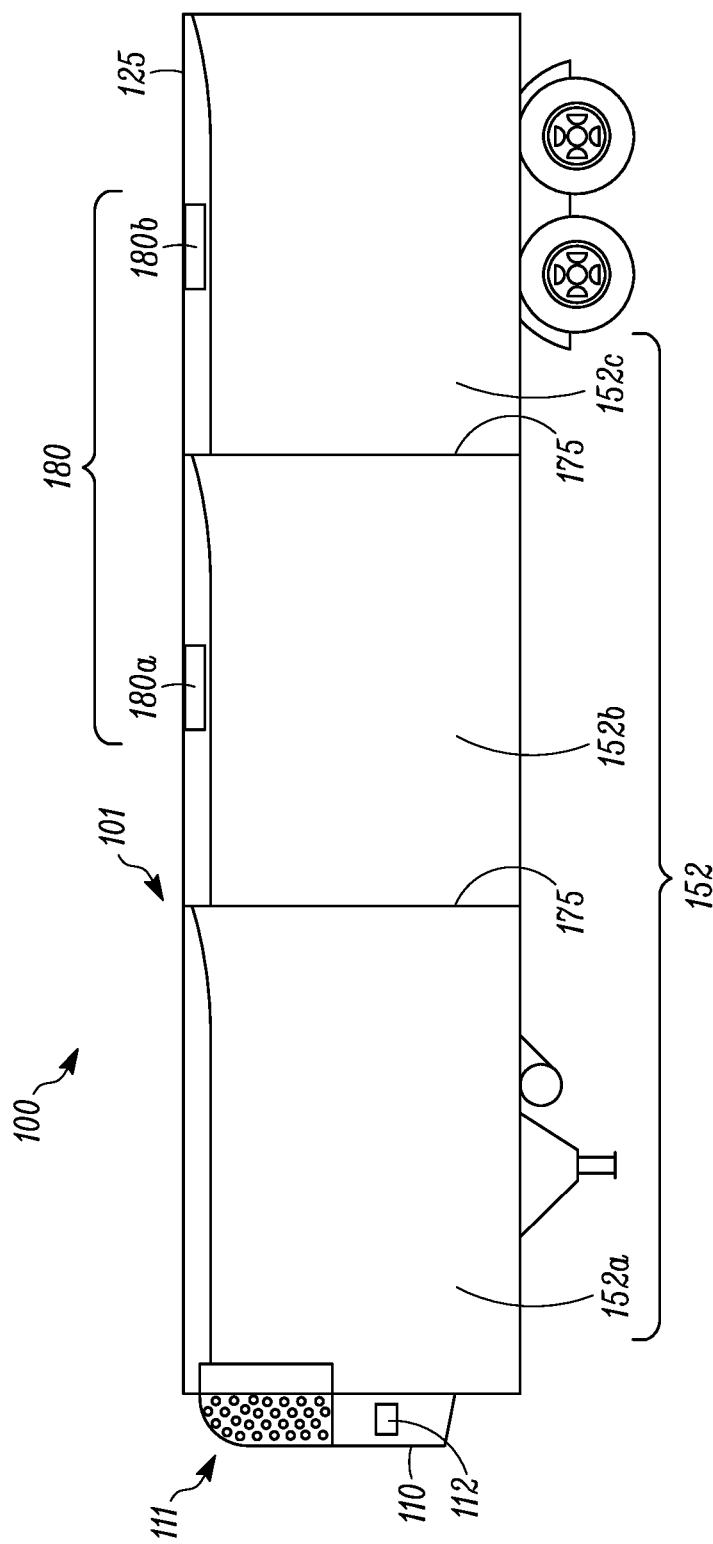
FIG. 1B illustrates a schematic cross sectional side view of the refrigerated transport unit shown in FIG. 1A, according to one embodiment.

FIG. 1B illustrates a schematic cross sectional side view of the TU 125 shown in FIG. 1A when the TRS 100 is a multi-zone TRS (MTRS) 101, according to one embodiment. As shown in FIG. 1B, the power source 112 is disposed in the TRU 110. In other embodiments, the power source 112 can be separate from the TRU 110. Also, in some embodiments, the power source 112 can include two or more different power sources disposed within or outside of the TRU 110. In some embodiments, the power source 112 can include a diesel engine, a battery, an alternator, a generator, a solar panel, a fuel cell, etc. When the power source 112 includes a diesel engine, the diesel engine can be less than a 25 horse power engine. Also, the diesel engine can be a two speed engine, a variable speed engine, etc. In some instances, the power source 112 can be required to not exceed a predefined power level. Exceeding the predefined power level can, for example, prevent the power source 112 from overloading, can prevent the power source 112 from exceeding, for example, government or customer requirements (e.g., noise level regulations, emission regulations, fuel usage limits, etc.).

With reference to FIGS. 1A and 1B, the internal space 150 may be divided into a plurality of zones 152. The term "zone" means a part of an area of the internal space 150 separated by walls 175. In some examples, each of the zones 152 can maintain a set of environmental condition parameters (e.g. temperature, humidity, air quality, etc.) that is independent from other zones 152.

Note that in FIG. 1B the internal space 150 is divided into three zones: a first zone 152*a*; a second zone 152*b*; and a third zone 152*c*. Each of the zones 152 shown in FIG. 1B is divided into substantially equal areas. However, it is to be realized that the internal space 150 may be divided into any number of zones in any size configuration that is suitable for environmental control of the different zones.

The MTRS 101 is configured to control and maintain separate environmental condition requirements in each of the zones 152. The MTRS 101 includes a host unit 111 provided within the TRU 110 for providing climate control within the first zone 152*a* and a plurality of remote units 180 disposed in the TU 125. Namely a first remote unit 180*a* is disposed in the second zone 152*b* and a second remote unit 180*b* is disposed in the third zone 152*c*. The host unit 111 and the remote units 180 are collectively herein referred to as heat exchange units.

Each remote unit 180*a*, 180*b* is fluidly connected to the host unit 111. The host unit 111 and each remote unit 180*a*, 180*b* may include one or more heat exchangers (e.g., evaporator(s)), one or more fan(s) for providing climate control within the particular zone the heat exchanger unit is located, one or more flow regulating devices (e.g., solenoid valve(s), etc.) for controlling the amount of refrigerant flow into the heat exchanger unit, and one or more throttling devices (e.g., electronic throttling valve(s), etc.) for controlling the amount of refrigerant flow available to a suction end of the compressor of the MTRS 101. The heat exchange units (e.g., the host unit 111 and each of the remote units 180) can operate in a plurality of operational modes (e.g., a NULL mode, a running NULL mode, a COOL mode, a HEAT mode, a DEFROST mode, a low fan speed mode, a high fan speed mode, a high engine speed mode, a low engine speed mode, etc.).

In the NULL mode, the MTRS 101 can be configured to prevent refrigerant flow through the heat exchanger unit and stop operation of the fan(s). In the running NULL mode, the MTRS 101 can be configured to prevent refrigerant flow through the heat exchanger unit and continue operation of the fan(s). In the COOL mode, the MTRS 101 can be configured to provide refrigerant low through the heat exchanger unit and/or allow operation of the fan(s) in order to provide cooling within the respective zone 152 of the transport unit 125. In the HEAT mode, the MTRS 101 can be configured to provide refrigerant low through the heat exchanger unit and/or allow operation of the fan(s) in order to provide heating within the respective zone 152 of the transport unit 125. In the DEFROST mode, the MTRS 101 can be configured to provide refrigerant flow through the heat exchanger unit and/or allow operation of the fan(s) in order to provide defrosting of one or more refrigeration components of the refrigeration circuit of the MTRS 101. In the low fan speed mode, the MTRS 101 can be configured to operate the fan(s) at a low speed when the fan(s) are two speed or variable speed fan(s). In the high fan speed mode, the MTRS 101 can be configured to operate the fan(s) at a high speed when the fan(s) are two speed or variable speed fan(s). In the low engine speed mode, the MTRS 101 can be configured to operate an engine of the power source at a low speed when the engine is two speed or variable speed engine. In the high engine speed mode, the MTRS 101 can be configured to operate an engine of the power source at a high speed when the engine is two speed or variable speed engine.

When the MTRS 101 changes an operational mode of one of the heat exchanger units (e.g., from the NULL mode to the COOL mode or vice versa, from the NULL mode to the HEAT mode or vice versa, from the COOL mode to the HEAT mode or vice versa, or a transition between any of the operation modes described above, etc.), the power available to the MTRS 101 can exceed the predefined power level of the power source 112.

Figure 2:
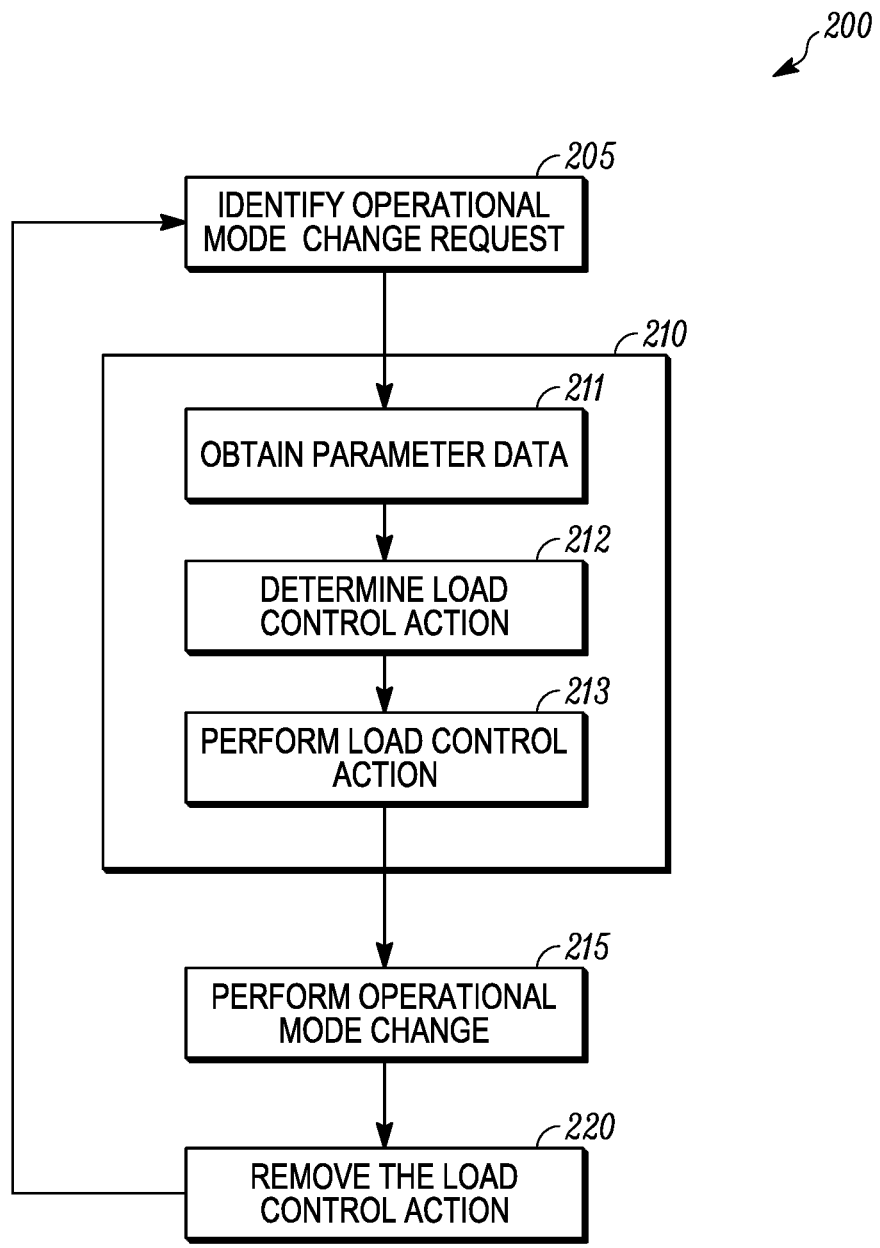
FIG. 2 illustrates an embodiment of a method to control a TRS to conduct an operational mode change of a heat exchanger unit of the TRS.
Figure 3:
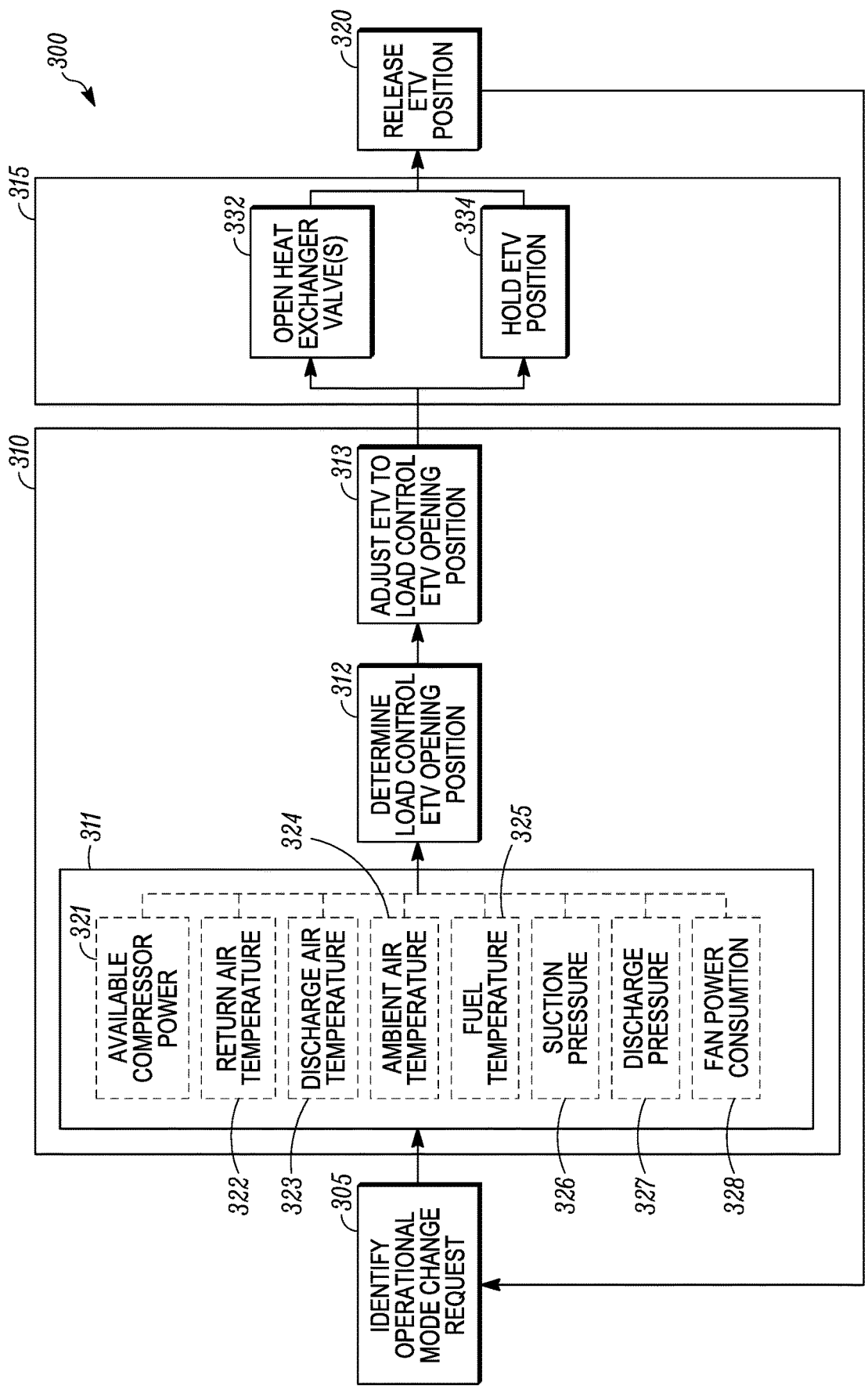
FIG. 3 illustrates another embodiment of a method to control a TRS to conduct an operational mode change of a heat exchanger unit of the TRS.

FIGS. 2 and 3 illustrate embodiments for regulating power source loading of a MTRS (e.g., the MTRS 101 shown in FIG. 1B) during an operational mode change of the MTRS. Accordingly, the MTRS can prevent a power source (e.g., the power source 112 shown in FIG. 1B) from operating outside of a predefined RPM bandwidth and/or exceeding a predefined power limit. While FIGS. 2-3 are directed to a MTRS it is appreciated that the embodiments described below can also be applied to a single-zone TRS (e.g., the TRS 100 shown in FIG. 1A) that may not include any remote evaporator units.

FIG. 2 illustrates a method 200 for regulating power source loading of a MTRS during an operational mode change of the MTRS. At 205, a controller (e.g., the TRS controller 170 shown in FIG. 1A) identifies an operational mode change request of one of the heat exchanger units (e.g., the host unit 111 or one of the remote evaporator units 180). The operational mode change request can be provided automatically by the controller based on a MTRS status (e.g., zone temperature, geographic location of the transport unit, status of the other heat exchanger units, etc.) or can be provided manually by a user via, for example, a human machine interface of the MTRS. Once the controller identifies the operational mode change request, the method proceeds to 210.

At 210, the controller prepares the MTRS for the operational mode change. Preparing the MTRS for the operational mode change can include: obtaining parameter data of the MTRS at 211; determining a load control action based on a future load of a power source of the MTRS at 212; and performing the load control action to adjust a load of the MTRS on the power source in preparation of the operational mode change at 213.

At 211, the controller is configured to obtain parameter data from one or more sensors of the MTRS. The parameter data can include one or more of: an available compressor horsepower; a return air temperature of the heat exchanger unit that has the operational mode change request; a discharge air temperature of the heat exchanger unit that has the operational mode change request; an ambient air temperature outside of the transport unit; a fuel temperature of fuel used by the power source; a suction pressure of the compressor; a discharge pressure of the compressor; an energy consumption of fan(s) of each of the other heat exchanger units; a return air temperature of one or more heat exchanger units that do not have the operational mode change request; an altitude at the current location of the MTRS; an air temperature at an engine inlet; an engine power output obtained, for example, from an engine control unit (ECU) of the engine; an engine coolant temperature obtained, for example, from the ECU; a battery charging load; miscellaneous MTRS electrical loads; and door switch status of one or more doors of the transport unit; an evaporator coil temperature; etc. It is noted that the parameter data collected by the controller is not limited. Any parameter that can be used to determine a load control action to prevent the power source from operating outside of a predefined RPM bandwidth and/or exceeding a predefined power limit can be used.

At 212, the MTRS (e.g., the controller) is configured to determine a load control action based on the parameter data obtained at 211. The load control action can be determined based on a future load of a power source (e.g., the power source 112 shown in FIG. 1B) of the MTRS. The future load of the power source refers to a predicted load on the power source during the operational mode change of the zone if no load control action is taken. The load control action can adjust a load on the power source in order to prevent the power source from operating outside of a predefined RPM bandwidth and/or exceeding a predefined power limit can be used.

At 213, the controller is configured to perform the load control action in order to adjust the load of the MTRS on the power source in preparation for the operational mode change such that the power source of the MTRS does not operate outside of a predefined RPM bandwidth and/or exceed a predefined power limit. In some embodiments, this can include performing a load control action to adjust the amount of load by the MTRS on the power source.

In one embodiment, the load control action can include controlling a refrigerant flow rate available to a suction end of a compressor of the MTRS and/or controlling a refrigerant flow rate flowing through an evaporator of the heat exchanger unit that will be performing the operational mode change. The MTRS can control the refrigerant flow rate available to the suction end of the compressor of the MTRS by controlling an opening position of the expansion device(s). The MTRS can control the refrigerant flow rate flowing into the heat exchanger unit by controlling an opening position of the flow regulating device(s). In another embodiment, the load control action can include adjusting a fan speed of one or more heat exchanger fans and/or blowers. In another embodiment, the load control action can include removing and/or reducing a battery charging load of a battery charger of the MTRS. In another embodiment, the load control action can include adjusting an engine speed of a power source of the MTRS when the power source is a two-speed or variable speed engine. In another embodiment, the load control action can include unloading a compressor of the MTRS.

When the expansion device(s) is an electronic throttling valve (ETV), the opening position of the ETV can be adjusted from a complete closed position to a complete open position and anywhere in between. For example, in one embodiment, the opening position of the ETV can be adjusted in steps from step 0 (e.g., a fully closed position) to step 1000 (e.g., a fully open position). Accordingly, the controller can adjust the load of the MTRS on the power source by controlling the position of the ETV, thereby preventing the power source from operating outside of a predefined RPM bandwidth and/or exceeding a predefined power limit. For example, in one embodiment, the load control action can be to adjust the opening position of the ETV from a first position to a second position. It is appreciated that the number of steps for adjusting the opening position of the ETV can vary based on the particular ETV being used and is not limited to 1000 steps as discussed in the embodiment above.

It is noted that, at 213, the load control action performed by the controller to prevent from operating outside of a predefined RPM bandwidth and/or exceeding a predefined power limit is not limited. Any load control action suitable to prevent the power source from operating outside of a predefined RPM bandwidth and/or exceeding a predefined power limit can be taken by the MTRS.

As shown in FIG. 2, upon preparing the MTRS for the operational mode change of the heat exchanger unit at 210, the method proceeds to 215. At 215, the controller is configured to change an operational mode change of the heat exchanger unit based on operational mode change request identified at 205. Due to the load control action performed by the controller at 213, the operational mode change can be performed without the power source operating outside of a predefined RPM bandwidth and/or exceeding a predefined power limit. The method 200 proceeds to 220.

At 220, the controller is configured to remove the load control action. Removing the load control action can include adjusting the load of the MTRS on the power source back to the load of the MTRS prior to performing the load control action. In some embodiments, this can include stopping the load control action performed at 213. For example, in one embodiment, when the load control action is to adjust the opening position of the ETV from the first position to the second position, the controller at 220 can be configured to adjust the opening position of the ETV from the second position back to the first position. The method 200 then returns to 205 and waits for the controller to identify another operational mode change request.

FIG. 3 illustrates another embodiment of a method 300 for regulating power source loading of a MTRS during an operational mode change of the MTRS. The method 300 may be a specific implementation of the method 200 illustrated in FIG. 2. The method 300 may also be implemented using the MTRS 101 shown in FIG. 1B. In this embodiment, the MTRS includes an expansion device that is an ETV for controlling a refrigerant flow rate available to the suction end of a compressor of the MTRS.

At 305, a controller (e.g., the TRS controller 170 shown in FIG. 1A) identifies an operational mode change request of one of the heat exchanger units (e.g., the host unit 111 or one of the remote evaporator units 180). The operational mode change request can be provided automatically by the controller based on a MTRS status (e.g., zone temperature, geographic location of the transport unit, status of the other heat exchanger units, etc.) or can be provided manually by a user via, for example, a human machine interface of the MTRS. Once the controller identifies the operational mode change request, the method proceeds to 310.

At 310, the controller prepares the MTRS for the operational mode change. Preparing the MTRS for the operational mode change can include: obtaining parameter data of the MTRS at 311; determining a load control ETV opening position based on the parameter data at 312; and adjusting the ETV to the load control ETV opening position at 313.

At 311, the controller is configured to obtain parameter data from one or more sensors of the MTRS. In particular, the controller is configured to obtain one or more of: an available compressor horsepower 321; a return air temperature of the heat exchanger that has the operational mode change request 322; a discharge air temperature of the heat exchanger that has the operational mode change request 323; an ambient air temperature outside of the transport unit 324; a fuel temperature of fuel used by the power source 325; a suction pressure of the compressor 326; a discharge pressure of the compressor 327; an energy consumption of fan(s) of each of the other heat exchanger units 328. It is noted that the parameter data collected by the controller is not limited. Any parameter that can be used to determine a load control action to prevent the power source from operating outside of a predefined RPM bandwidth and/or exceeding a predefined power limit can be used. For example, in one embodiment, the controller can be configured to obtain the available compressor horsepower obtained at 321, the ambient air temperature obtained at 324 and the return air temperature obtained at 322. Also, in some embodiments, the parameter data can include the parameters listed in the parameter data discussion above regarding FIG. 2.

At 312, the controller determines a load control ETV opening position, as the load control action, for the expansion device of the MTRS based on the parameter data obtained at 311. By controlling the refrigerant flow rate available to the suction end of the compressor, the MTRS can adjust the amount of load on the power source.

The load control ETV opening position can be determined based on a future load of a power source (e.g., the power source 112 shown in FIG. 1B) of the MTRS. The future load of the power source refers to a predicted load on the power source during the operational mode change of the zone if no load control action is taken. Adjusting the expansion device to the load control ETV opening position can adjust a load on the power source in order to prevent the power source from operating outside of a predefined RPM bandwidth and/or exceeding a predefined power limit can be used.

Figure 4:
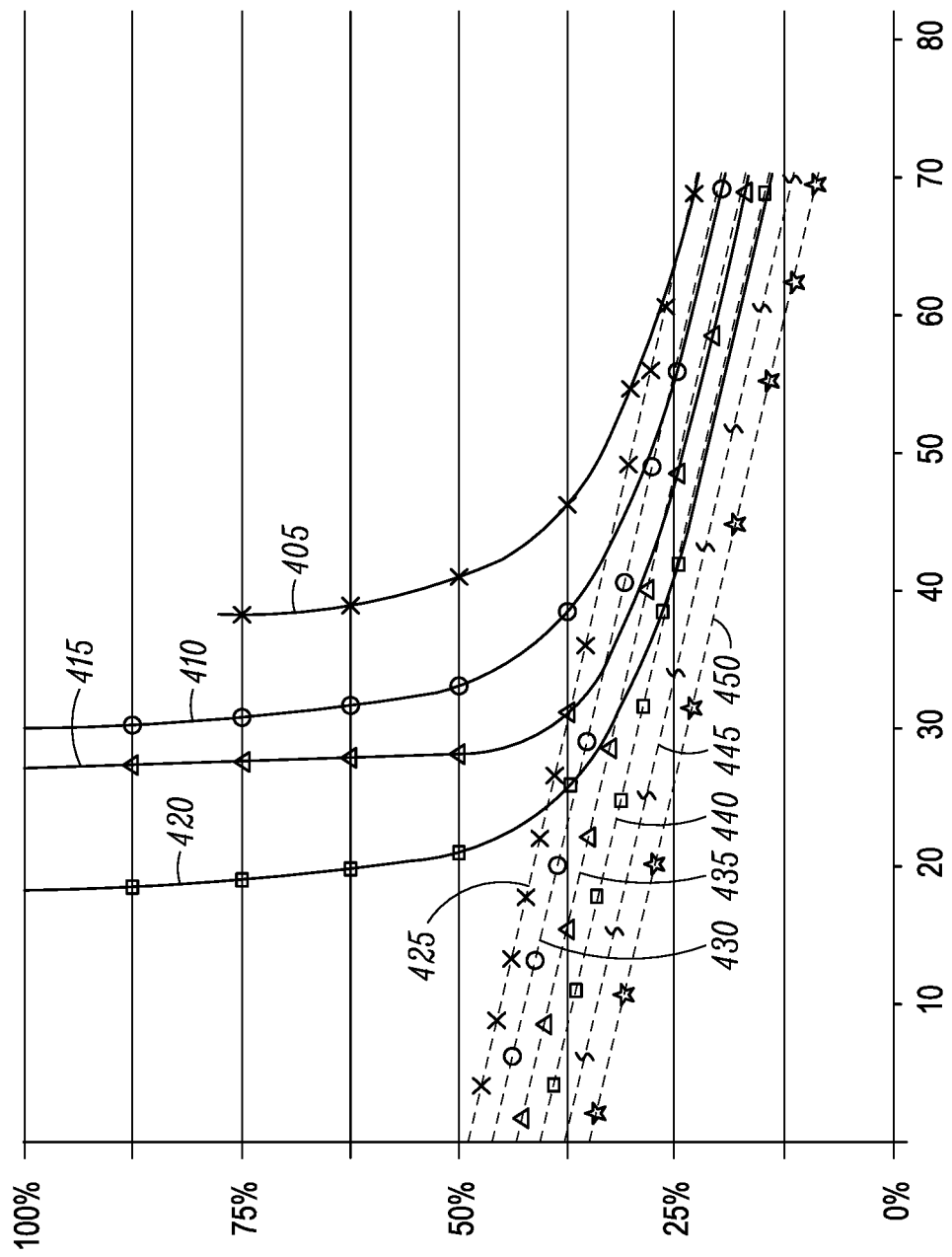
FIG. 4 illustrates a graph that can be used for determining a load control action based on a return air temperature of a heat exchanger unit and an ambient temperature outside of the transport unit, according to one embodiment.

In some embodiments, the controller can derive the load control ETV opening position based on experimental data of the load on the power source at different values of the parameter data. The experimental data can be obtained, for example, via lab simulation, via field testing, etc. For example, FIG. 4 illustrates a graph 400 for deriving the load control ETV opening position based on the ambient air temperature obtained at 324 and the return air temperature obtained at 322, according to one embodiment. The graph 400 is also based on the available compressor horsepower obtained at 321 set as a constant value. In other embodiments, the available compressor horsepower obtained at 321 can be included as a variable value for deriving the load control ETV opening position.

The graph 400 includes a plurality of exponential ambient temperature curves 405, 410, 415, 420 and a plurality of linear temperature curves 425, 430, 435, 440, 445, 450 for estimating the load control ETV opening position (along the y-axis) at various return air temperatures (along the x-axis). Each of the exponential ambient temperature curves 405, 410, 415 and 420 and each of the linear represent a particular ambient temperature. As shown in FIG. 4, the curves 405 and 425 represent a first ambient temperature, the curves 410 and 430 represent a second ambient temperature, the curves 415, 435 represent a third ambient temperature, the curves 420 and 440 represent a fourth ambient temperature, the curve 445 represents a fifth ambient temperature and the curve 450 represents a sixth ambient temperature.

The exponential ambient temperature curves 405, 410, 415, 420 and the linear temperature curves 425, 430, 435, 440, 445, 450 can be derived based off of experimental data of a MTRS. That is, the exponential ambient temperature curves 405, 410, 415, 420 are derived based off of an exponential extrapolation model of the ambient temperature and the return air temperature at a constant available compressor horse power using experimental data. Similarly, the linear ambient temperature curves 425, 430, 435, 440, 445, 450 are derived based off of a linear extrapolation model of the ambient temperature and the return air temperature at a constant available compressor horse power using experimental data. In this embodiment, the linear extrapolation model can be a more conservative model as compared to the exponential extrapolation model to ensure that the power source does not operate outside of the predefined RPM bandwidth and/or exceed the predefined power limit.

In one embodiment, the controller can determine a load control ETV opening position based on the ambient temperature obtained at 324 and the return air temperature obtained at 322 at a constant available compressor horse power obtained at 321 using, for example, the exponential curves 405, 410, 415, 420 or the linear curves 425, 430, 435, 440, 445, 450.

Returning to FIG. 3, at 313, the controller is configured to instruct the expansion device to adjust the ETV opening position from its current ETV opening position to the load control ETV opening position in preparation for the operational mode change. This allows the MTRS to prevent the power source of the MTRS from operating outside of a predefined RPM bandwidth and/or exceeding a predefined power limit.

At 315, the controller is configured to perform an operational mode change of the heat exchanger unit based on operational mode change request identified at 305. This includes completing the operational mode change by opening one or more valves of the heat exchanger unit to switch the heat exchanger from one operational mode to the desired operational mode 332. This also includes the controller instructing the ETV to hold the opening position to the load control opening position 334. By holding the ETV to the load control opening position, the operational mode change can be performed without the power source operating outside of a predefined RPM bandwidth and/or exceeding a predefined power limit. The method 300 then proceeds to 320.

At 320, the controller is configured to instruct the ETV to release the load control ETV opening position. The method 300 then returns to 305 and waits for the controller to identify another operational mode change request.

It is noted that the embodiments discussed above are exemplary only and are in no way limiting the true scope of the invention defined by the claims.

Aspects:

It is appreciated that any of aspects 1-18 can be combined.

Aspect 1. A method for controlling a transport refrigeration system for a transport unit, comprising:

identifying an operational mode change request for a heat exchanger unit of the transport refrigeration system;

preparing the transport refrigeration system for the operational mode change of the heat exchanger unit, wherein preparing the transport refrigeration system for the operational mode change of the heat exchanger unit includes performing a load control action, the load control action preventing a power source of the transport refrigeration system from at least one of operating outside of a predefined revolutions per minute (RPM) bandwidth and exceeding a predefined power limit of the power source;

changing the operational mode of the heat exchanger unit; and removing the load control action.

Aspect 2. The method of aspect 1, wherein preparing the transport refrigeration system for the operational mode change of the heat exchanger unit includes:

obtaining parameter data of the transport refrigeration system;

determining a load control action based on a future load of the power source, wherein the future load of the power source is a predicted load on the power source during the operational mode change of the heat exchanger unit when no load control action is performed; and performing the load control action.

Aspect 3. The method of aspect 2, wherein obtaining parameter data of the transport refrigeration system includes obtaining at least one of: an available compressor horsepower; a return air temperature of the heat exchanger unit; a discharge air temperature of the heat exchanger unit; an ambient air temperature outside of the transport unit; a fuel temperature of fuel used by the power source; a suction pressure of a compressor of the transport refrigeration system; a discharge pressure of the compressor; an energy consumption of a fan of a second heat exchanger unit; a return air temperature of the second heat exchanger unit; an altitude at the current location of the transport refrigeration system; an air temperature at an engine inlet; an engine power output of an engine of the transport refrigeration system; an engine coolant temperature; a battery charging load of a battery of the transport refrigeration system; a miscellaneous transport refrigeration system electrical load; and a door switch status of one or more doors of the transport unit; an evaporator coil temperature of an evaporator of the transport refrigeration system.

Aspect 4. The method of any one of aspects 1-3, wherein performing the load control action includes at least one of:
controlling a refrigerant flow rate;
adjusting a fan speed of a fan of the heat exchanger unit;
reducing a battery charging load of a battery charger of the transport refrigeration system;
adjusting an engine speed of an engine of the transport refrigeration system; and
unloading a compressor of the transport refrigeration system.

Aspect 5. The method of any one of aspects 1-4, wherein removing the load control action includes adjusting a load on the transport refrigeration system back to a load level of the transport refrigeration system prior to performing the load control action.

Aspect 6. The method of any one of aspects 1-5, wherein preparing the transport refrigeration system for the operational mode change of the heat exchanger unit includes:
obtaining parameter data of the transport refrigeration system,
determining a load control determining a load control electronic throttle valve (ETV) opening position based on the parameter data, and
performing the load control action includes adjusting the adjusting the ETV to the load control ETV opening position.

Aspect 7. The method of aspect 6, wherein determining the load control ETV opening position includes determining a predicted load on a power source of the transport refrigeration system during the operation mode change when no load control action is performed.

Aspect 8. The method of aspect 6, wherein changing the operational mode of the heat exchanger unit includes:
opening a heat exchanger valve of the heat exchanger unit to switch the heat exchanger unit from a first operational mode to a desired operational mode, and
instructing the ETV to hold the load control ETV opening position.

Aspect 9. The method of aspect 8, wherein removing the load control action includes instructing the ETV to release the load control ETV opening position.

Aspect 10. A transport refrigeration system for a transport unit, comprising:
a heat exchanger unit; and
a controller that is configured to:
identify an operational mode change request of the heat exchanger unit;
prepare the transport refrigeration system for the operational mode change of the heat exchanger unit, including performing a load control action, wherein preparing the transport refrigeration system for the operational mode change of the heat exchanger unit includes the controller performing a load control action, the load control action preventing a power source of the transport refrigeration system from at least one of operating outside of a predefined revolutions per minute (RPM) bandwidth and exceeding a predefined power limit of the power source;
change the operational mode of the heat exchanger unit;
remove the load control action after changing the operational mode of the heat exchanger unit.

Aspect 11. The transport refrigeration system of aspect 10, wherein the controller is configured to:
obtain parameter data of the transport refrigeration system; to determine a load control action based on a future load of the power source, wherein the future load of the power source is a predicted load on the power source during the operational mode change of the heat exchanger unit when no load control action is performed; and to perform the load control action,
in order to prepare the transport refrigeration system for the operational mode change of the heat exchanger unit.

Aspect 12. The transport refrigeration system of aspect 11, wherein the controller is configured to obtain at least one of:
an available compressor horsepower; a return air temperature of the heat exchanger unit; a discharge air temperature of the heat exchanger unit; an ambient air temperature outside of the transport unit; a fuel temperature of fuel used by the power source; a suction pressure of a compressor of the transport refrigeration system; a discharge pressure of the compressor; an energy consumption of a fan of a second heat exchanger unit; a return air temperature of the second heat exchanger unit; an altitude at the current location of the transport refrigeration system; an air temperature at an engine inlet; an engine power output of an engine of the transport refrigeration system; an engine coolant temperature; a battery charging load of a battery of the transport refrigeration system; a miscellaneous transport refrigeration system electrical load; and a door switch status of one or more doors of the transport unit; an evaporator coil temperature of an evaporator of the transport refrigeration system,
in order to obtain parameter data of the transport refrigeration system.

Aspect 13. The transport refrigeration system of any one of aspects 10-12, wherein the controller is configured to at least one of:
control a refrigerant flow rate;
adjust a fan speed of a fan of the heat exchanger unit;
reduce a battery charging load of a battery charger of the transport refrigeration system;
adjust an engine speed of an engine of the transport refrigeration system; and
unload a compressor of the transport refrigeration system,
in order to perform the load control action.

Aspect 14. The transport refrigeration system of any one of aspects 10-13, wherein the controller is configured to adjust a load on the transport refrigeration system back to a load level of the transport refrigeration system prior to performing the load control action in order to remove the load control action.

Aspect 15. The transport refrigeration system of any one of aspects 10-14, wherein the controller is configured to:
obtain parameter data of the transport refrigeration system, determine a load control determining a load control electronic throttle valve (ETV) opening position based on the parameter data, and perform the load control action by adjusting the adjusting the ETV to the load control ETV opening position, in order to prepare the transport refrigeration system for the operational mode change of the heat exchanger unit.

Aspect 16. The transport refrigeration system of aspect 15, wherein the controller is configured to determine a predicted load on a power source of the transport refrigeration system during the operation mode change when no load control action is performed in order to determine the load control ETV opening position.

Aspect 17. The transport refrigeration system of aspect 15, wherein the controller is configured to:

open a heat exchanger valve of the heat exchanger unit to switch the heat exchanger unit from a first operational mode to a desired operational mode, and instruct the ETV to hold the load control ETV opening position, in order to change the operational mode of the heat exchanger unit.

Aspect 18. The transport refrigeration system of aspect 17, wherein the controller is configured to instruct the ETV to release the load control ETV opening position in order to remove the load control action.

What is claimed is:

1. A method for controlling a transport refrigeration system for a transport unit, comprising:

a heat exchanger unit of the transport refrigeration system providing climate control of an internal space of the transport unit;

identifying an operational mode change request for the heat exchanger unit;

preparing the transport refrigeration system for an operational mode change of the heat exchanger unit requested by the operational mode change request, wherein preparing the transport refrigeration system for the operational mode change of the heat exchanger unit includes:

obtaining parameter data of the transport refrigeration system by measuring one or more parameters of the transport refrigeration system, determining a load control action based on the parameter data, wherein determining the load control action includes determining a future load of the power source based on the parameter data, and determining the load control action and a degree in which the load control action is to be applied based on the future load of the power source, wherein the future load of the power source is a predicted load on the power source during the operational mode change of the heat exchanger unit when no load control action is performed, and performing the load control action to the determined degree, the load control action preventing a power source of the transport refrigeration system from at least one of operating outside of a predefined revolutions per minute (RPM) bandwidth and exceeding a predefined power limit of the power source;

changing the operational mode of the heat exchanger unit; and removing the load control action.

2. The method of claim 1, wherein obtaining parameter data of the transport refrigeration system includes obtaining at least one of: a return air temperature of the heat exchanger unit; a discharge air temperature of the heat exchanger unit; an ambient air temperature outside of the transport unit; a fuel temperature of fuel used by the power source; a suction pressure of a compressor of the transport refrigeration system; a discharge pressure of the compressor; an energy consumption of a fan of a second heat exchanger unit; a return air temperature of the second heat exchanger unit; an altitude at the current location of the transport refrigeration system; a battery charging load of a battery of the transport refrigeration system;

and an evaporator coil temperature of an evaporator of the transport refrigeration system.

3. The method of claim 1, wherein performing the load control action based on the parameter data includes at least one of:

controlling a refrigerant flow rate based on the parameter data;

adjusting a fan speed of a fan of the heat exchanger unit based on the parameter data;

reducing a battery charging load of a battery charger of the transport refrigeration system based on the parameter data;

adjusting an engine speed of an engine of the transport refrigeration system based on the parameter data; and unloading a compressor of the transport refrigeration system based on the parameter data.

4. The method of claim 1, wherein removing the load control action includes adjusting a load on the transport refrigeration system back to a load level of the transport refrigeration system prior to performing the load control action.

5. The method of claim 1, wherein determining the load control action based on the parameter data includes determining a load control electronic throttle valve (ETV) opening position for an ETV of the transport refrigeration system based on the parameter data, and wherein performing the load control action includes adjusting the ETV to the load control ETV opening position.

6. The method of claim 5, wherein changing the operational mode of the heat exchanger unit includes:

opening a heat exchanger valve of the heat exchanger unit to switch the heat exchanger unit from a first operational mode to a desired operational mode, and instructing the ETV to hold the load control ETV opening position.

7. The method of claim 6, wherein removing the load control action includes instructing the ETV to release the load control ETV opening position.

8. A transport refrigeration system for a transport unit, comprising:

a heat exchanger unit for providing climate control of an internal space of the transport unit; and a controller that is configured to:

identify an operational mode change request for the heat exchanger unit;

prepare the transport refrigeration system for an operational mode change of the heat exchanger unit requested in the operational mode change request, wherein preparing the transport refrigeration system for the operational mode change of the heat exchanger unit includes:

the controller obtaining parameter data of the transport refrigeration system that includes one or more measurements of one or more parameters of the transport refrigeration system, the controller determining a load control action based on the parameter data, wherein the controller determining the load control action based on the parameter data includes the controller determining a future load of the power source based on the parameter data, and the controller determining the load control action and a degree in which the load control action is to be applied based on the future load of the power source, wherein the future load of the power source is a predicted load on the power source during the operational mode change of the heat exchanger unit when no load control action is performed, and the controller performing the load control action to the determined degree, the load control action preventing a power source of the transport refrigeration system from at least one of operating outside of a predefined revolutions per minute (RPM) bandwidth and exceeding a predefined power limit of the power source;

change the operational mode of the heat exchanger unit; and remove the load control action after changing the operational mode of the heat exchanger unit.

9. The transport refrigeration system of claim 8, wherein the controller is configured to obtain at least one of:
a return air temperature of the heat exchanger unit; a discharge air temperature of the heat exchanger unit; an ambient air temperature outside of the transport unit; a fuel temperature of fuel used by the power source; a suction pressure of a compressor of the transport refrigeration system; a discharge pressure of the compressor; an energy consumption of a fan of a second heat exchanger unit; a return air temperature of the second heat exchanger unit; an altitude at the current location of the transport refrigeration system a battery charging load of a battery of the transport refrigeration system an evaporator coil temperature of an evaporator of the transport refrigeration system,
in order to obtain the parameter data of the transport refrigeration system.

10. The transport refrigeration system of claim 8, wherein the controller is configured to at least one of:
control a refrigerant flow rate based on the parameter data;
adjust a fan speed of a fan of the heat exchanger unit based on the parameter data;
reduce a battery charging load of a battery charger of the transport refrigeration system based on the parameter data;
adjust an engine speed of an engine of the transport refrigeration system based on the parameter data; and
unload a compressor of the transport refrigeration system based on the parameter data, in order to perform the load control action based on the parameter data.

11. The transport refrigeration system of claim 8, wherein the controller is configured to adjust a load on the transport refrigeration system back to a load level of the transport refrigeration system prior to performing the load control action in order to remove the load control action.

12. The transport refrigeration system of claim 8, wherein the controller is configured to determine a load control electronic throttle valve (ETV) opening position for an ETV of the refrigerated transport system based on the parameter data, in order to determine the load control action based on the parameter data, and
wherein the controller is configured to adjust the ETV to the load control ETV opening position, in order to perform the load control action based on the parameter data.

13. The transport refrigeration system of claim 12, wherein the controller is configured to:
open a heat exchanger valve of the heat exchanger unit to switch the heat exchanger unit from a first operational mode to a desired operational mode, and
instruct the ETV to hold the load control ETV opening position, in order to change the operational mode of the heat exchanger unit.

14. The transport refrigeration system of claim 13, wherein the controller is configured to instruct the ETV to release the load control ETV opening position, in order to remove the load control action.

15. The method of claim 3, wherein performing the load control action based on the parameter data includes at least one of:
adjusting the fan speed of the fan of the heat exchanger unit based on the parameter data,
reducing the battery charging load of the battery charger of the transport refrigeration system based on the parameter data,
adjusting the engine speed of the engine of the transport refrigeration system based on the parameter data, and
unloading the compressor of the transport refrigeration system based on the parameter data.

16. The method of claim 3, wherein changing the operational mode of the heat exchanger unit includes:
changing the heat exchanger unit from a first operational mode to a desired operational mode, the first operational mode and the desired operational mode being different, the operational modes for the heat exchanger unit include two or more of a null mode, a running null mode, a cool mode, a heat mode, a defrost mode, a low fan speed mode, and a high fan speed mode.

17. A transport refrigeration system for a transport unit, comprising:
a heat exchanger unit for providing climate control of an internal space of the transport unit; and
a controller that is configured to:
identify an operational mode change request for the heat exchanger unit;
prepare the transport refrigeration system for an operational mode change of the heat exchanger unit requested in the operational mode change request, wherein preparing the transport refrigeration system for the operational mode change of the heat exchanger unit includes:
the controller obtaining parameter data of the transport refrigeration system that includes one or more measurements of one or more parameters of the transport refrigeration system,
the controller determining a load control action based on the parameter data, wherein the controller determining the load control action based on the parameter data includes the controller determining a degree in which the load control action is to be applied based on the parameter data, and
the controller performing the load control action to the determined degree, the load control action preventing a power source of the transport refrigeration system from at least one of operating outside of a predefined revolutions per minute (RPM) bandwidth and exceeding a predefined power limit of the power source;
change the operational mode of the heat exchanger unit; and
remove the load control action after changing the operational mode of the heat exchanger unit, wherein removing the load control action includes the controller adjusting a load on the transport refrigeration system back to a load level of the transport refrigeration system prior to performing the load control action.

18. The transport refrigeration system of claim 17, wherein the controller is configured to at least one of:

control a refrigerant flow rate based on the parameter data;

adjust a fan speed of a fan of the heat exchanger unit based on the parameter data;

reduce a battery charging load of a battery charger of the transport refrigeration system based on the parameter data;

adjust an engine speed of an engine of the transport refrigeration system based on the parameter data; and unload a compressor of the transport refrigeration system based on the parameter data, in order to perform the load control action based on the parameter data.

19. The transport refrigeration system of claim 17, wherein the controller is configured to determine a load control electronic throttle valve (ETV) opening position for an ETV of the refrigerated transport system based on the parameter data, in order to determine the load control action based on the parameter data, and wherein the controller is configured to adjust the ETV to the load control ETV opening position, in order to perform the load control action based on the parameter data.

20. The transport refrigeration system of claim 19, wherein the controller is configured to:

open a heat exchanger valve of the heat exchanger unit to switch the heat exchanger unit from a first operational mode to a desired operational mode, and instruct the ETV to hold the load control ETV opening position, in order to change the operational mode of the heat exchanger unit, and the controller is configured to instruct the ETV to release the load control ETV opening position, in order to remove the load control action.

\* \* \* \* \*